3,506,695
PROCESS FOR SEPARATING SATURATED FROM UNSATURATED FATTY ACIDS
Adolf Koebner, St. Bees, and Thomas Thornton, Moresby Parks, near Whitehaven, England, assignors to Marchon Products Limited, London, England, a British company
No Drawing. Continuation-in-part of application Ser. No. 319,586, Oct. 28, 1963. This application July 28, 1967, Ser. No. 656,658
Claims priority, application Great Britain, Dec. 7, 1962, 46,254/62
The portion of the term of the patent subsequent to Apr. 22, 1986, has been disclaimed
Int. Cl. C11c 1/08
U.S. Cl. 260—419                                    11 Claims

ABSTRACT OF THE DISCLOSURE

Fatty acids of high polarity may be separated from high fatty acids of low polarity in admixture therewith by dissolving the mixture of fatty acids in an aqueous solution of aryl or alkaryl sulphonates of sufficient concentration to dissolve the mixture of acids therein and then cooling the solution to crystallise out the acids of low polarity which are recovered relatively free from the high fatty acids of high polarity, these latter may be recovered from the aqueous sulphonate solution by dilution of the sulphonate solution to yield a fatty acid oily layer.

The present invention relates to a process for separating higher fatty acids of low polarity from higher fatty acids of high polarity and is a continuation-in-part of our application Ser. No. 319,586 filed Oct. 28, 1963 and now abandoned.

Many animal and vegetable oils consist of mixtures of the glyceride esters of saturated and unsaturated higher fatty acids. The fatty acids may be obtained from the oils by hydrolysis of the esters, but the product is a mixture of saturated and unsaturated acids. An example of such a mixture of acids is that obtained from tallow oil which contains: palmitic acid 27.4% and stearic acid 14.1% (saturated acids) and oleic acid 49.6% and linoelic acid 8.9% (unsaturated acids). The mixture of higher fatty acids is conventionally separated upon an industrial scale by dissolving the mixture in methanol or acetone and then cooling the solution to below 0° C. whereupon the saturated higher fatty acids crystallise out. However, both the solvents used are toxic and it is a disadvantage to have to cool the solutions to such low levels. Furthermore, when methanol is used as the solvent, a certain amount of acid is lost by ester formation. An alternative method for separating those mixtures of acids where one component is solid at room temperature comprises forming an emulsion of the liquid components and thereafter washing the emulsion out of the solid component. Howevre, with this method it is not possible, except with difficulty, to obtain the components which have been emulsified as a pure material free from the emulsifying agent.

We have now found that concentrated aqueous solutions of certain aryl and alkaryl sulphonates have the property of dissolving the higher fatty acids of high polarity in preference to those of low polarity and that, after removal of the solution of acids from the undissolved components, the dissolved acids may be recovered from their solution in the aqueous sulphonate by dilution of the solution with water. This is to be contrasted with the process wherein emulsification of the liquid component of a fatty acid mixture is achieved in that emulsification is brought about by a surface-active agent, whereas the compounds for present use do not depress the surface tension of water to a marked degree. Furthermore, the present invention enables both of the separated components to be obtained in substantially pure form.

The term "higher fatty acids" as used herein means those acids containing at least 12 carbon atoms. As is well known, the degree of polarity of a fatty acid depends on its degree of saturation and its chain length, the polarity decreasing as each of these two factors increases. The saturated higher fatty acids, regardless of chain length, are less polar than the unsaturated higher fatty acids with one exception, namely erucic acid which is the main constituent of rape seed oil and has 22 carbon atoms and one double bond. For convenience saturated acids, together with erucic acid, are hereinafter referred to as a group as "low polarity higher fatty acids," while the remaining unsaturated acids are referred to as a group as "higher polarity higher fatty acids."

Accordingly, the present invention provides a process for separating higher fatty acids of low polarity from higher fatty acids of high polarity which comprises dissolving the mixture of fatty acids at a temperature above the melting of said mixture in an aqueous solution of an aryl or alkaryl sulphonate, which sulphonate does not markedly depress the surface tension of water; the concentration of said sulphonate in said aqueous solution being at least sufficient to enable said mixture of acids to dissolve therein at said temperature; and then cooling the solution to room temperature or below, whereupon the acids of low polarity crystallise out and are recovered relatively free from those of high polarity.

The invention may be applied with special advantage to mixtures of acids having chain lengths in the range 12–22 carbon atoms, of which, as mentioned above, the tallow acids are typical. Other acid mixtures to which the invention may advantageously be applied are rape seed oil- and linseed oil-derived acids.

The invention can also be applied to mixtures of acids partially neutralised by alkalis.

The sulphonates for present use are the ammonuim, and alkali metal salts of those aryl and alkyl-aryl, e.g. alkyl benzene, sulphonic acids which do not markedly depress the surface tension of water. There may be up to 3 alkyl groups on each aryl group and the alkyl groups should not contain more than 4 carbon atoms. Compounds suitable for present use include sodium or potassium benzene, toluene, cumene and xylene sulphonates, preferably the sodium xylene sulphonate being that sold under the registered trademark Eltesol SX, and the ammonium or alkali metal salts of naphthalene sulphonic acids. The sodium salts of benzene sulphonic acid and alkyl benzene sulphonic acids such as sodium xylene sulphonate and sodium toluene sulphonate, which is sold under the registered trademark Eltesol ST, are particularly economic.

The greater the concentration of the aqueous sulphonate solution, the more readily does the acid mixture dissolve therein, but it is best to use only the minimum concentration that will completely dissolve the mixture at the lowest temperature at which it is convenient to prepare the solution, this temperature being one which is just above the melting point of the mixture of acids. In the case of tallow acid, this temperature is 70° C. It will be understood that by the melting point of the mixture is meant the temperature at which the whole of the mixture has melted. The concentration of sulphonate usually required to dissolve the fatty acid mixture is 35% or more. However, in the case of cumene sulphonates, it is possible to operate at concentrations as low as 25%. Preferred concentrations for all sulphonates are from 40 to 60%. The upper limit of the concentration of the sulphonate solution employed is limited solely by the solubility of the sulphonate in water.

The temperature to which the solution of acids in aqueous sulphonate is cooled in order to crystallise the low polarity acids is usually room temperature, as this provides a good yield of crystals of the low polarity acids without the necessity for providing expensive cooling equipment. The higher the polarity of the low polarity acids to be recovered, the less the yield of such acids at a given temperature, and it may be desirable in some cases to cool to a temperature below room temperature, e.g., to a temperature between 0° and room temperature, in order to obtain the desired yield of crystallised acids.

When the bulk of the acids of low polarity has crystallised out, the acids of high polarity together with a residue of the low polarity acids remain in solution. The acids left in solution can be recovered by diluting the solution with water until the acids separate out as an oily layer. The dilution is usually such that the concentration of sulphonate falls below 40%, or about 20% in the case of cumene sulphonates.

In order to improve the purity of crystallised acids, the product obtained on the first crystallization can be recrystallised using further quantities of the same solvent.

The invention is illustrated by the following examples:

EXAMPLE 1

An aqueous solution of 50% by weight of sodium xylene sulphonate (SXS) was prepared and divided into three equal parts. In each of these was dissolved at 70° C. a proportion of tallow fatty acid as shown in the table. Each solution was allowed to cool for several hours to room temperature (20° C.). Saturated fatty acids crystallised and were filtered off. Water was then added to the filtrate until the unsaturated acids separated as an oily layer, which took place at a concentration of SXS to water of below 40% by weight. The oily layer was run off and the SXS solution was concentrated by evaporation to 50% strength for re-use. The separated acids were washed free of traces of SXS and dried. The iodine values and yields of the saturated and unsaturated fractions are given in the following table:

TABLE

| Percent tallow fatty acid | 10 | 20 | 30 |
|---|---|---|---|
| Saturated acid fraction: | | | |
| Yield, percent | 63 | 66 | 65.6 |
| Iodine value | 19.1 | 21.9 | 21.1 |
| Unsaturated acid fraction: | | | |
| Yield, percent | 37 | 34 | 34.4 |
| Iodine value | 89.0 | 89.8 | 90.6 |

EXAMPLE 2

The procedure of Example 1 was repeated using a 30% solution of tallow fatty acid. The saturated acids fraction was then recrystallised by the same procedure. The iodine values and yields of the various fractions were as follows:

| | Iodine value | Yield, percent |
|---|---|---|
| 1st crystallisation: | | |
| Saturated fraction | 16.7 | 56.6 |
| Unsaturated fraction | 82.0 | 43.4 |
| 2nd crystallisation: | | |
| Saturated fraction | 4.6 | 83.2 |
| Unsaturated fraction | 76.8 | 16.8 |

EXAMPLE 3

The procedure of Example 1 was repeated using a 30% solution of tallow fatty acid, but the solution was cooled in about 1 hour. The iodine values and yields were as follows:

| | Iodine value | Yield, percent |
|---|---|---|
| Saturated fraction | 6.8 | 43.5 |
| Unsaturated fraction | 74.8 | 56.2 |

This shows that quick cooling gives a purer saturated acid fraction, but in smaller yield.

EXAMPLE 4

The procedure of Example 1 was repeated using a 30% solution of tallow fatty acid, but instead of SXS, a mixture of 80:20 by weight of sodium and potassium xylene sulphonate was used, and the solution was cooled to 0° C. The iodine values and yields were as follows:

| | Iodine value | Yield, percent |
|---|---|---|
| Saturated fraction | 25.5 | 69.8 |
| Unsaturated fraction | 90.0 | 30.2 |

EXAMPLE 5

The procedure of Example 4 was repeated using ammonium xylene sulphonate. The iodine values and yields were as follows:

| | Iodine value | Yield, percent |
|---|---|---|
| Saturated fraction | 21.0 | 64.8 |
| Unsaturated fraction | 89.2 | 35.2 |

EXAMPLE 6

30 g. of rape seed fatty acid was dissolved in 100 g. of an aqueous solution containing 50 g. sodium xylene sulphonate. The mixture was cooled to 0° C. and the crystals of erucic acid were filtered on a vacuum filter at the temperature or crystallisation. The crystals were washed with water and dried. Yield 13.6 g. The mother liquor was diluted with water to isolate dissolved fatty acid. These fatty acids were washed with water and dried. Yield 16.4 g. The iodine values of the starting material and the two fractions were as follows:

Iodine value
Rape seed fatty acid _____ 105.5 g. 1/100 g.
Erucic acid fraction (theoretical 78 g. 1/100 g.) _____ 86.8 g. 1/100 g.
Mixed acids _____ 121 g. 1/100 g.

EXAMPLE 7

The procedure of Example 6 was carried out using linseed oil fatty acids instead of rape seed oil fatty acid. The results were as follows:

Iodine value
Linseed oil fatty acid _____ 184.5 g. 1/100 g.
Linoleic acid concentrate (yield 21.3 g.) _____ 207 g. 1/100 g.
Unsaturated fraction (yield 8.7 g.) ____ 129 g. 1/100 g.

EXAMPLE 8

The process of Example 1 was repeated using a 3% solution of tallow fatty acids in aqueous sodium toluene sulphonate (35% by weight). The results were as follows:

Iodine value
Saturated fraction _____ 19
Unsaturated fraction _____ 76

EXAMPLE 9

The process of Example 1 was repeated using a 18% solution of tallow fatty acids in aqueous sodium xylene sulphonate (40% by weight). The results were as follows:

Iodine value
Saturated fraction _____ 18.5
Unsaturated fraction _____ 76

EXAMPLE 10

The process of Example 1 was repeated using a 9% solution of tallow fatty acids in aqueous sodium cumene sulphonate (25% by weight). The results were as follows:

Iodine value
Saturated fraction _____ 20
Unsaturated fraction _____ 79

EXAMPLE 11

The process of Example 1 was repeated using a 30% solution of tallow fatty acids in aqueous sodium cumene sulphonate (50% by weight). The results were as follows:

|  | Iodine value |
|---|---|
| Saturated fraction | 20 |
| Unsaturated fraction | 82 |

We claim:

1. The process for separating a first group of fatty acids consisting of saturated fatty acids containing 12–22 carbon atoms and erucic acid from a second group of fatty acids consisting of unsaturated fatty acids containing 12–22 carbon atoms from a mixture of fatty acids containing at least one acid of each of said groups comprising
    dissolving said mixture of fatty acids at a temperature above the melting point of said mixture in an aqueous solution containing at least 35% by weight of at least one ammonium or alkali metal salt of a mononucleararyl or alkylmononucleararyl sulphonic acid wherein the aromatic nucleus contains up to three alkyl substituents and the total number of carbon atoms of all the alkyl substituents does not exceed four,
    then cooling the solution to room temperature or below to crystallize the acids of said first group of fatty acids, and
    then recovering said crystallized fatty acids.

2. The process of claim 1 wherein said sulphonic acid salt is selected from the ammonium or alkali metal salts of benzene, toluene, and xylene sulphonic acids.

3. The process of claim 1 wherein the fatty acids remaining in solution after crystallization of said first group of fatty acids are recovered as an oil phase by diluting the mother liquor with water.

4. The process of claim 1 wherein said salt is sodium xylene sulphonic acid.

5. The process of claim 2 wherein the concentration of said aqueous sulphonic acid solution is at least 40% by weight.

6. The process of claim 2 wherein the fatty acids remaining in solution after recrystallization of said first group of fatty acids are recovered as an oil phase by diluting the mother liquor with water.

7. The process of claim 2 wherein said salt is sodium xylene sulphonic acid.

8. The process of claim 5 wherein the fatty acids remaining in solution after crystallization of said first group of fatty acids are recovered as an oil phase by diluting the mother liquor with water.

9. The process of claim 5 wherein said salt is sodium xylene sulphonic acid.

10. The process for separating a first group of fatty acids consisting of saturated fatty acids containing 12–22 carbon atoms and erucic acid from a second group of fatty acids consisting of unsaturated fatty acids containing 12–22 carbon atoms from a mixture of fatty acids containing at least one acid of each of said groups comprising
    dissolving said mixture of fatty acids at a temperature above the melting point of said mixture in an aqueous solution containing at least 25% by weight of at least one ammonium or alkali metal salt of cumene sulphonic acid,
    then cooling the solution to room temperature or below to crystallize the acids of said first group of acids, and
    then recovering said crystallized fatty acids.

11. The process of claim 10 wherein the fatty acids remaining in solution after crystallization of said first group of fatty acids are recovered as an oil phase by diluting the mother liquor with water.

References Cited

UNITED STATES PATENTS

| 628,503 | 7/1899 | Twitchell | 260—402 |
|---|---|---|---|
| 918,612 | 4/1909 | Twitchell | 260—419 |
| 2,113,960 | 4/1938 | Grote et al. | 260—419 |
| 2,800,493 | 7/1957 | Stein et al. | 260—419 |

LEON ZITVER, Primary Examiner

HOWARD T. MARS, Assistant Examiner

UNITED STATES PATENT OFFICE
CERTIFICATE OF CORRECTION

Patent No. 3,506,695　　　　　　　　　Dated April 14, 1970

Inventor(s) ADOLF KOEBNER and THOMAS THORNTON

It is certified that error appears in the above-identified patent and that said Letters Patent are hereby corrected as shown below:

Column 5, line 42, cancel "recrystallization" and in its place insert --crystallization--.

SIGNED AND SEALED
SEP 15 1970

(SEAL)
Attest:

Edward M. Fletcher, Jr.
Attesting Officer

WILLIAM E. SCHUYLER, JR.
Commissioner of Patents